(12) United States Patent
Ono et al.

(10) Patent No.: US 8,562,188 B2
(45) Date of Patent: Oct. 22, 2013

(54) WIRING STRUCTURE OF REAR COMBINATION LIGHT

(75) Inventors: Kazuhiko Ono, Wako (JP); Makoto Hattori, Wako (JP); Koji Suzuki, Wako (JP); Yoshiya Omuro, Wako (JP); Masayuki Hojo, Wako (JP); Katsuhisa Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 13/242,992

(22) Filed: Sep. 23, 2011

(65) Prior Publication Data

US 2012/0081914 A1     Apr. 5, 2012

(30) Foreign Application Priority Data

Sep. 30, 2010  (JP) ................................. 2010-220626

(51) Int. Cl.
*F21V 33/00*   (2006.01)

(52) U.S. Cl.
USPC ............ 362/473; 362/475; 362/544; 362/541

(58) Field of Classification Search
USPC ......... 362/473, 475, 476, 541, 543, 544, 507, 362/487
See application file for complete search history.

(56) References Cited

U.S. PATENT DOCUMENTS

| 6,454,450 B1 * | 9/2002 | Oishi et al. ................... 362/544 |
| 6,715,909 B2 * | 4/2004 | Serizawa ...................... 362/545 |
| 2006/0023466 A1 * | 2/2006 | Tsai .............................. 362/541 |

FOREIGN PATENT DOCUMENTS

| JP | 06-297998 | 10/1994 |
| JP | 11-321744 | 11/1999 |

* cited by examiner

*Primary Examiner* — Laura Tso
(74) *Attorney, Agent, or Firm* — Ditthavong Mori & Steiner, P.C.

(57) ABSTRACT

A wiring structure of a rear combination light of a vehicle includes a light-side wire, a vehicle-body-side wire holding portion, a stay, a light-side wire holding portion and a wire coupler. The vehicle-body-side wire holding portion is mounted on a rear surface of the vehicle body to hold an intermediate portion of a vehicle-body-side wire. The light-side wire holding portion is mounted on the stay to hold an intermediate portion of the light-side wire on a distal end portion of the stay. The wire coupler is arranged between the rear surface of the vehicle body and a back surface of the rear combination light. The light-side wire is connected to the vehicle-body-side wire via the wire coupler in a state where the rear combination light is mounted on the rear portion of the vehicle body.

20 Claims, 5 Drawing Sheets

WIRING STRUCTURE OF REAR COMBINATION LIGHT

CROSS-REFERENCE TO RELATED APPLICATIONS

The present application claims priority under 35 U.S.C. §119 to Japanese Patent Application No. 2010-220626, filed Sep. 30, 2010. The contents of this application are incorporated herein by reference in their entirety.

BACKGROUND OF THE INVENTION

1. Field of the Invention

The present invention relates to a wiring structure of a rear combination light.

2. Discussion of the Background

With respect to a rear combination light of a miniaturized scooter where a tail lamp and a flasher lamp are formed into a unit by arranging the tail lamp and the flasher lamp in the inside of a common light body, as described in Japanese Unexamined Patent Application Publication No. JP-A-11-321744, there has been known a rear combination light where wires which are connected to the tail lamp and the flasher lamp are tied together to form a single wire in the inside of the light body, and one wire extending from the light body is connected to a vehicle-body-side wire using a connector arranged at a terminal thereof. Further, in a four-wheeled vehicle, as disclosed in Japanese Unexamined Patent Application Publication No. JP-A-6-297998, a rear combination light on a left side and a rear combination light on a right side are independently constituted, a vehicle-body-side wire and a light-side wire are connected with each other by a waiting connector and, at the same time, both rear combination lights are mounted on a rear portion of a vehicle body.

SUMMARY OF THE INVENTION

According to one aspect of the present invention, a wiring structure of a rear combination light of a vehicle includes a light-side wire, a vehicle-body-side wire holding portion, a stay, a light-side wire holding portion and a wire coupler. The light-side wire extends from the rear combination light which is mounted on a rear portion of a vehicle body and which faces a rear surface of the vehicle body. The light-side wire is connected to a vehicle-body-side wire between the rear surface of the vehicle body and the rear combination light. The vehicle-body-side wire holding portion is mounted on the rear surface of the vehicle body to hold an intermediate portion of the vehicle-body-side wire. The stay extends along a mounting direction to mount the rear combination light on the rear portion of the vehicle body. The stay is mounted on the rear combination light. The light-side wire holding portion is mounted on the stay to hold an intermediate portion of the light-side wire on a distal end portion of the stay. The wire coupler is arranged between the rear surface of the vehicle body and a back surface of the rear combination light. The light-side wire is connected to the vehicle-body-side wire via the wire coupler in a state where the rear combination light is mounted on the rear portion of the vehicle body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
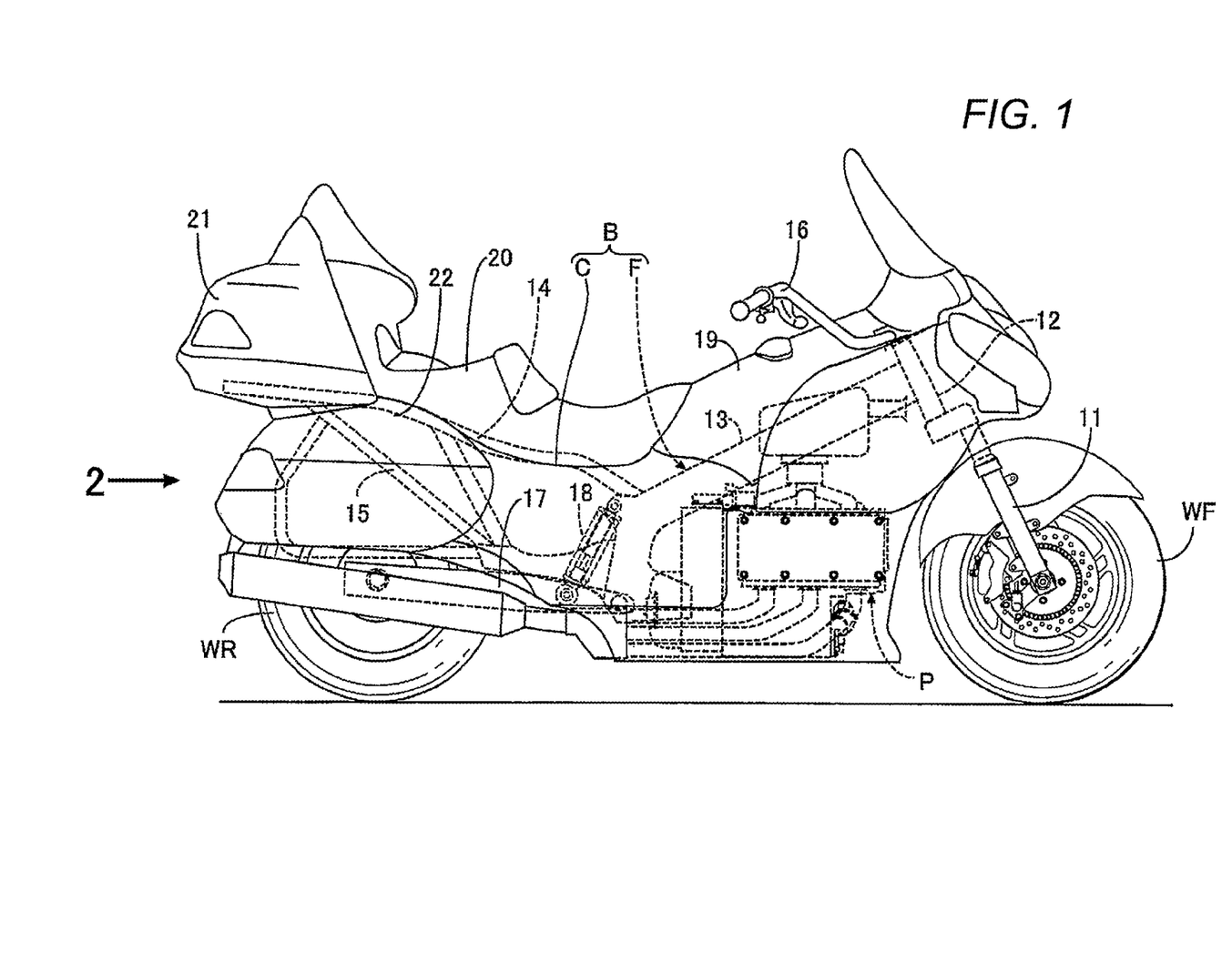
FIG. 1 is a side view of a motorcycle.

To explain an embodiment of the present invention in conjunction with attached drawings FIG. 1 to FIG. 6, firstly, in FIG. 1, a vehicle body frame F of a motorcycle which constitutes a vehicle includes: a head pipe 12 which steerably supports a front fork 11 which pivotally supports a front wheel WF; a main frame 13 which extends in the rearward and downward direction from the head pipe 12; a seat rail 14 which extends in the rearward and upward direction from a rear end upper portion of the main frame 13, and a back stay 15 which connects a rear end lower portion of the main frame 13 and an approximately rear portion of the seat rail 14.

A steering handle 16 is connected to an upper portion of the front fork 11. Further, a front end portion of a swing arm 17 is supported on a rear end portion of the main frame 13 in a vertically swingable manner, and a rear wheel WR which constitutes a drive wheel is pivotally supported on a rear end portion of the swing arm 17. Further, a rear cushion unit 18 is arranged between an upper portion of a rear end of the main frame 13 and the swing arm 17.

A power unit P which drives the rear wheel WR is arranged in a space below the main frame 13, and the power unit P is supported on the main frame 13 by way of a plurality of hanger members which are not explicitly shown in the drawing.

A fuel tank 19 is supported on the main frame 13 above the power unit P, and a tandem-type rider's seat 20 which is arranged behind the fuel tank 19 is supported on the seat rail 14.

A portion of the power unit P and the vehicle body frame F are covered with a vehicle body cover C which constitutes a vehicle body B in combination with the vehicle body frame F, and a trunk 21 which is arranged behind the rider's seat 20 and above the rear wheel WR and a pair of side bags 22 which is arranged on left and right sides of the rear wheel WR are supported on a rear portion of the vehicle body B.

Figure 2:
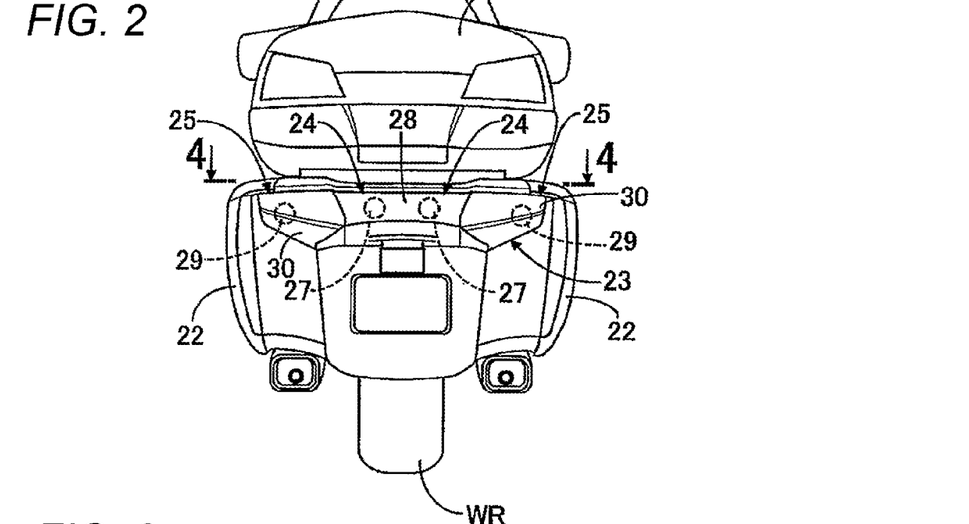
FIG. 2 is a view of the motorcycle as viewed in the direction indicated by an arrow 2 in FIG. 1.
Figure 3:
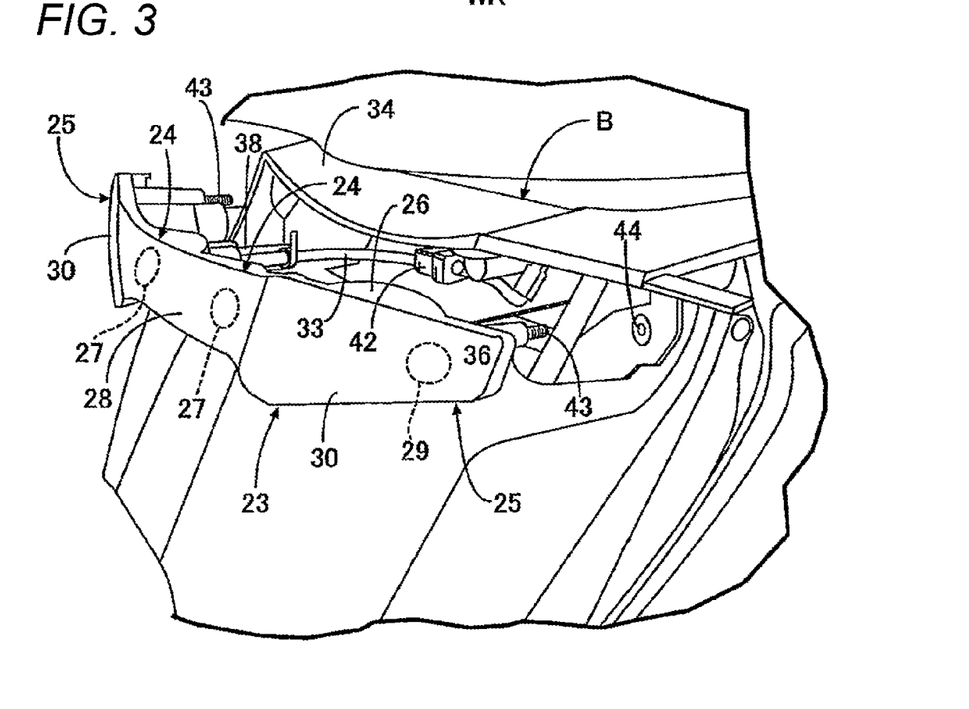
FIG. 3 is a perspective view showing a state where a rear combination light is removed from a rear portion of a vehicle body as viewed from a rear side of the vehicle body.
Figure 4:
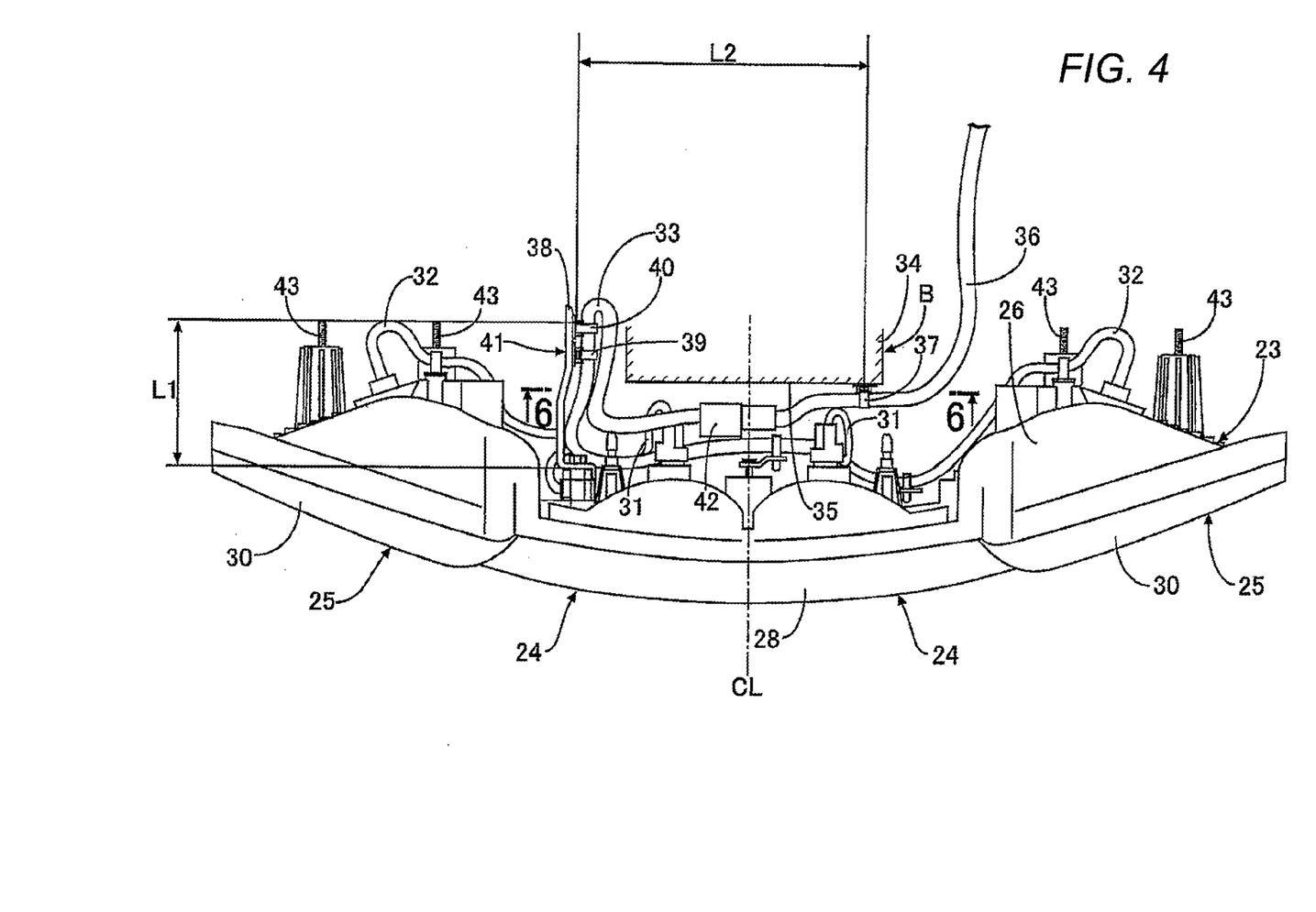
FIG. 4 is a view showing the constitution taken along a line 4-4 in FIG. 2.

As shown in FIG. 2 to FIG. 4, a rear combination light 23 is mounted on the rear portion of the vehicle body B in a state where the rear combination light 23 is arranged below the trunk 21. The rear combination light 23 includes a pair of left and right tail lights 24, 24, and a pair of left and right blinker lights 25, 25 which sandwich these tail lights 24 ... from both sides in the vehicle widthwise direction.

A housing 26 of the rear combination light 23 is formed such that the housing 26 opens rearward and is elongated in the vehicle widthwise direction. The pair of left and right tail lights 24 ... is constituted of the housing 26, a pair of left and right tail-light bulbs 27, 27 which is housed in a longitudinally middle portion of the housing 26, and a tail-light lens 28 which covers a rear open end of the housing 26 in a state where the tail-light lens 28 is arranged behind the tail-light bulbs 27 .... Further, the blinker lights 25 ... respectively include the housing 26, a blinker bulb 29 which is housed in a longitudinally end portion of the housing 26, and a blinker lens 30 which is arranged behind the blinker bulb 29.

Individual wires 31 ... which are connected with both tail-light bulbs 27 ... and individual wires 32 ... which are individually connected with both tail-light bulbs 29 ... are tied together as a light-side wire 33, and extend toward a front side, that is, toward a vehicle body B side.

Figure 5:
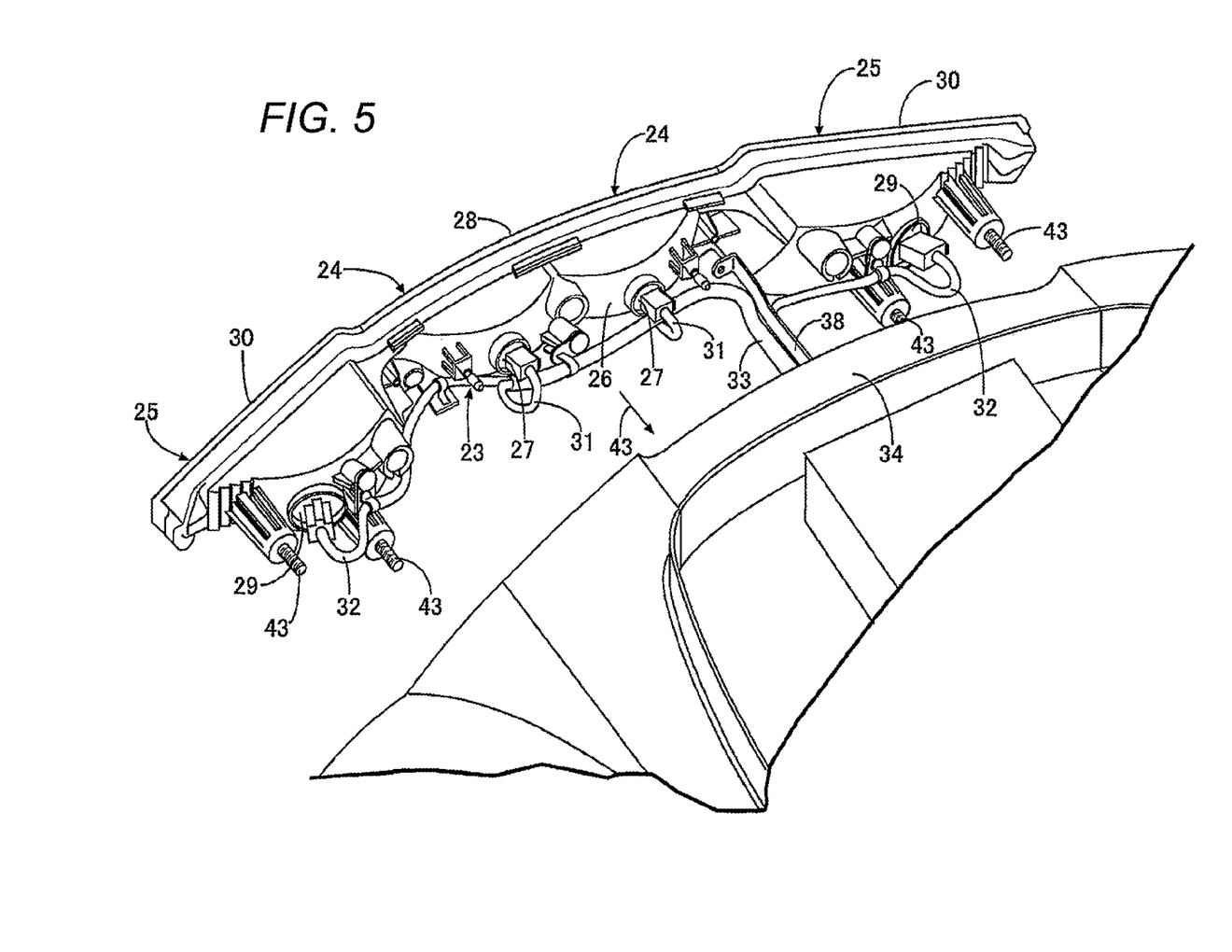
FIG. 5 is a perspective view showing a state where the rear combination light is removed from the rear portion of the vehicle body as viewed from a front side of the vehicle body.
Figure 6:
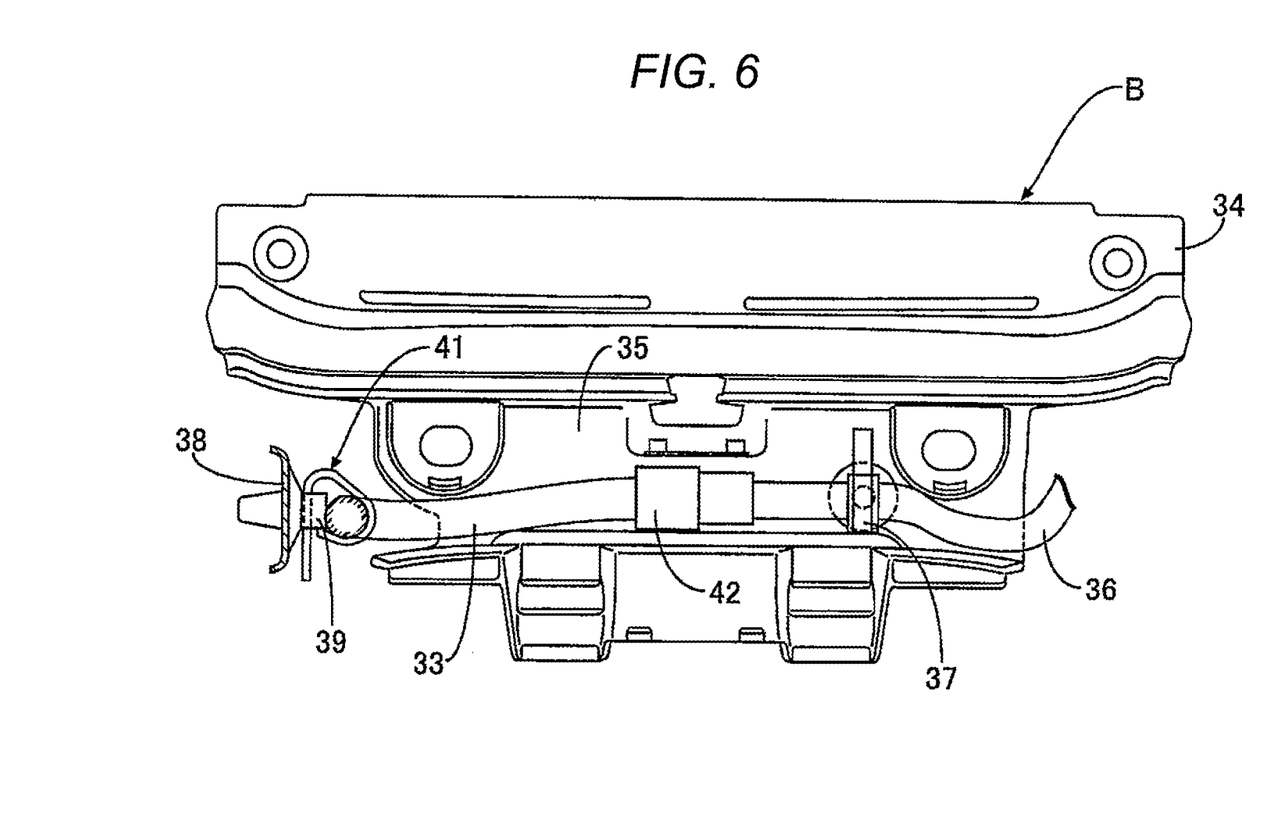
FIG. 6 is a cross-sectional view taken along a line 6-6 in FIG. 4.

To explain the constitution also in conjunction with FIG. 5 and FIG. 6, a rear cowl 34 which constitutes a portion of the vehicle body cover C is arranged between upper portions of the left and right side bags 22 by fixing such that the rear cowl 34 constitutes a portion of the vehicle body B, and the rear combination light 23 is mounted on a rear portion of the vehicle body B such that the rear combination light 23 faces a rear surface of the rear cowl 34, that is, a rear surface 35 of the vehicle body B in an opposed manner.

Pairs of mounting bolts 43, 43 ... are respectively fixed as stud bolts to rear portions of both left and right end sides of the housing 26 of the rear combination light 23 in a projecting manner toward the vehicle body B side. On the other hand, as shown in FIG. 3, insertion holes 44 ... which allow the respective mounting bolts 43 ... to pass therethrough are formed in both left and right sides of the rear portion of the vehicle body B corresponding to the respective mounting bolts 43 ... individually. By fastening nuts not shown in the drawing to the mounting bolts 43 ... which are inserted into the insertion holes 44 ... by threaded engagement from a front side of the vehicle body, the rear combination light 23 can be mounted on the rear portion of the vehicle body B in a state where the rear combination light 23 faces the rear surface 35 of the vehicle body B in an opposed manner.

The light-side wire 33 extending from the rear combination light 23 mounted on the rear portion of the vehicle body B while facing the rear surface 35 of the vehicle body B in an opposed manner is connected to a vehicle-body-side wire 36 between the rear surface 35 of the vehicle body B and the rear combination light 23.

A first clip 37 which constitutes a vehicle-body-side wire holding portion for holding an intermediate portion of the vehicle-body-side wire 36 is mounted on the rear surface 35 of the vehicle body B, a stay 38 which extends along the mounting direction for mounting the rear combination light 23 on the rear portion of the vehicle body B is mounted on the rear combination light 23, a light-side wire holding portion 41 which holds an intermediate portion of the light-side wire 33 on a distal end portion of the stay 38 is mounted on the stay 38, and the light-side wire holding portion 41 is constituted of second and third clips 39, 40 which are mounted on the stay 38 in a spaced-apart manner in the longitudinal direction of the stay 38.

In a state where the rear combination light 23 is mounted on the rear portion of the vehicle body B, the light-side wire 33 is connected to the vehicle-body-side wire 36 by way of a wire coupler 42 which is arranged between the rear surface 35 of the vehicle body B and a back surface of the rear combination light 23.

As shown in FIG. 4 and FIG. 5, the stay 38 is mounted on the rear combination light 23 at a position offset to one side (left side) from an imaginary straight line CL which extends in the longitudinal direction while passing the center of the rear combination light 23 in the vehicle widthwise direction, and the first clip 37 is arranged at a position offset to the other side (right side) from the straight line CL of the rear combination light 23 in the vehicle-widthwise direction in a state where the rear combination light 23 is mounted on the rear portion of the vehicle body B.

Further, as shown in FIG. 3, a length L1 of the stay 38 is set such that, in a state where the rear combination light 23 is mounted on the rear portion of the vehicle body B, a distal end portion of the stay 38 extends toward a front side of the vehicle body beyond the rear surface 35 of the vehicle body B on which the first clip 37 is mounted. Further, a wire length of the light-side wire 33 from the first clip 37 to the holding portion at a distal end portion of the stay 38 is set to a value which is obtained by adding the length L1 of the stay 38 to a length L2 between the stay 38 and the first clip 37 in a state where the rear combination light 23 is mounted on the rear portion of the vehicle body B.

Next, to explain the manner of operation of this embodiment, the light-side wire 33 extending from the rear combination light 23 which is mounted on the rear portion of the vehicle body B while facing the rear surface 35 of the vehicle body B of the motorcycle in an opposed manner is connected to the vehicle-body-side wire 36 between the rear surface 35 of the vehicle body B and the rear combination light 23. Here, the stay 38 which extends along the mounting direction for mounting the rear combination light 23 on the rear portion of the vehicle body B is mounted on the rear combination light 23, the light-side wire holding portion 41 which holds the intermediate portion of the light-side wire 33 on the distal end portion of the stay 38 is mounted on the stay 38, the first clip 37 for holding the intermediate portion of the vehicle-body-side wire 36 is mounted on the rear surface 35 of the vehicle body B, and the light-side wire 33 is connected to the vehicle-body-side wire 36 by way of the wire coupler 42 which is arranged between the rear surface 35 of the vehicle body B and the back surface of the rear combination light 23 in a state where the rear combination light 23 is mounted on the rear portion of the vehicle body B. Accordingly, even when a room is given to the light-side wire 33 to secure an operation space for carrying out a wire connection operation before mounting the rear combination light 23 on the rear portion of the vehicle body B, an energizing route of the light-side wire 33 is held at least from the rear combination light 23 to the distal end of the stay 38. Further, no slackening of the light-side wire 33 occurs and hence, the rear combination light 23 can be mounted on the rear portion of the vehicle body B in such a manner that the occurrence of sandwiching of the light-side wire 33 can be prevented while making an energizing route correction operation unnecessary whereby man-hours of a mounting/dismounting operation of the rear combination light 23 can be decreased thus contributing to the enhancement of operation efficiency.

Further, the stay 38 is mounted on the rear combination light 23 at a position offset to one side from the imaginary straight line CL which extends in the longitudinal direction while passing the center of the rear combination light 23 in the vehicle widthwise direction, and the first clip 37 is arranged at a position offset to the other side from the imaginary straight line CL in the vehicle widthwise direction in a state where the rear combination light 23 is mounted on the rear portion of the vehicle body B. Accordingly, a distance between the stay 38 and the first clip 37 can be set relatively large in a state where the rear combination light 23 is mounted on the rear portion of the vehicle body B and hence, the connection and the release of the connection using the wire coupler 42 can be performed easily.

Further, the length L1 of the stay 38 is set such that, in a state where the rear combination light 23 is mounted on the rear portion of the vehicle body B, the distal end portion of the stay 38 extends toward the front side of the vehicle body beyond the rear surface 35 of the vehicle body B on which the first clip 37 is mounted and hence, in a state where the rear combination light 23 is mounted on the rear portion of the vehicle body B, the distal end portion of the stay 38 where the intermediate portion of the light-side wire 33 is held is positioned closer to the front side of the vehicle body than the first clip 37 whereby it is possible to further surely prevent the occurrence of sandwiching of the light-side wire 33.

Further, a wire length of the light-side wire 33 from the first clip 37 to the holding portion at the distal end portion of the stay 38 is set to a value which is obtained by adding the length L1 of the stay 38 to the length L2 between the stay 38 and the first clip 37 in a state where the rear combination light 23 is mounted on the rear portion of the vehicle body B. Accordingly, it is possible to secure an operation space for carrying out the connection operation and the connection releasing operation using the wire coupler 41 between the rear surface 35 of the vehicle body B and the rear combination light 23 at the time of mounting the rear combination light 23 on the rear portion of the vehicle body B and at the time of removing the rear combination light 23 from the rear portion of the vehicle body B.

Further, the rear combination light 23 which includes the pair of left and right tail lights 24 . . . and the pair of left and right blinker lights 25 . . . which sandwiches the tail lights 24 . . . from both sides in the vehicle widthwise direction is mounted on the rear portion of the vehicle body B of the motorcycle and hence, it is possible to provide the wiring structure suitable for the left-and-right pair type rear combination light 23 for the motorcycle.

Further, the rear combination light 23 is arranged below the trunk 21 which is arranged above the rear wheel WR of the motorcycle and hence, even in the motorcycle where the securing of an operation space is difficult, the wiring operation of the rear combination light 23 can be carried out relatively easily whereby the man-hours for a mounting/dismounting operation of the rear combination light 23 can be reduced.

The embodiment of the present invention is directed to the wiring structure of a rear combination light where a light-side wire extending from the rear combination light which is mounted on a rear portion of a vehicle body while facing a rear surface of the vehicle body in an opposed manner is connected to a vehicle-body-side wire between the rear surface of the vehicle body and the rear combination light, wherein the first technical feature of the present invention lies in that a vehicle-body-side wire holding portion for holding an intermediate portion of the vehicle-body-side wire is mounted on the rear surface of the vehicle body, a stay which extends along the mounting direction for mounting the rear combination light on the rear portion of the vehicle body is mounted on the rear combination light, a light-side wire holding portion which holds an intermediate portion of the light-side wire on a distal end portion of the stay is mounted on the stay, and in a state where the rear combination light is mounted on the rear portion of the vehicle body, the light-side wire is connected to the vehicle-body-side wire by way of a wire coupler which is arranged between the rear surface of the vehicle body and a back surface of the rear combination light.

According to this embodiment, the intermediate portion of the light-side wire is held at the distal end portion of the stay which extends along the mounting direction for mounting the rear combination light on the rear portion of the vehicle body and is mounted on the rear combination light. Accordingly, even when a room is given to the light-side wire to secure an operation space for carrying out a wire connection operation before mounting the rear combination light on the rear portion of the vehicle body, an energizing route of the light-side wire is held at least from the rear combination light to the distal end of the stay, and no slackening of the light-side wire occurs and hence, the rear combination light can be mounted on the rear portion of the vehicle body in such a manner that the occurrence of sandwiching of the light-side wire can be prevented while making an energizing route correction operation unnecessary whereby man-hours of a mounting/dismounting operation of the rear combination light can be decreased thus contributing to the enhancement of operation efficiency.

Further, in the embodiment, the stay may be mounted on the rear combination light at a position offset to one side from an imaginary straight line which extends in the longitudinal direction while passing the center of the rear combination light in the vehicle widthwise direction, and the vehicle-body-side wire holding portion may be arranged at a position offset to the other side from the imaginary straight line in the vehicle widthwise direction in a state where the rear combination light is mounted on the rear portion of the vehicle body.

According to this embodiment, the stay is offset to one side from the center of the rear combination light in the vehicle widthwise direction, and the vehicle-body-side wire holding portion is offset to the other side from the center of the rear combination light in the vehicle widthwise direction and hence, a distance between the stay and the vehicle-body-side wire holding portion can be set relatively large in a state where the rear combination light is mounted on the rear portion of the vehicle body whereby the connection and the release of the connection using the wire coupler can be performed easily.

In the embodiment, a length of the stay may be set such that, in a state where the rear combination light is mounted on the rear portion of the vehicle body, a distal end portion of the stay extends toward a front side of the vehicle body beyond the rear surface of the vehicle body on which the vehicle-body-side wire holding portion is mounted.

According to this embodiment, in a state where the rear combination light is mounted on the rear portion of the vehicle body, the distal end portion of the stay where the intermediate portion of the light-side wire is held is positioned closer to the front side of the vehicle body than the rear surface of the vehicle body where the vehicle-body-side wire holding portion is mounted and hence, it is possible to further surely prevent the occurrence of sandwiching of the light-side wire.

In the embodiment, a wire length of the light-side wire from the vehicle-body-side wire holding portion to the light-side wire holding portion at a distal end portion of the stay may be set to a value which is obtained by adding a length of the stay to a length between the stay and the vehicle-body-side wire holding portion in a state where the rear combination light is mounted on the rear portion of the vehicle body.

According to this embodiment, by setting the wire length of the light-side wire from the vehicle-body-side wire holding portion to the holding portion of the distal end portion of the stay to a value which is obtained by adding the length of the stay to the length between the stay and the vehicle-body-side wire holding portion in a state where the rear combination light is mounted on the rear portion of the vehicle body, it is possible to secure an operation space for carrying out a connection operation and a connection releasing operation using the wire coupler between the rear surface of the vehicle body and the rear combination light at the time of mounting the rear combination light on the rear portion of the vehicle body and at the time of removing the rear combination light from the rear portion of the vehicle body.

In the embodiment, the rear combination light may include a pair of left and right tail lights, and a pair of left and right blinker lights which sandwiches the tail lights from both sides in the vehicle widthwise direction.

According to this embodiment, it is possible to provide the wiring structure suitable for the left-and-right pair type rear combination light.

In the embodiment, the vehicle body may be a vehicle body of a motorcycle.

According to this embodiment, it is possible to provide the wiring structure of the rear combination light suitable for a motorcycle.

Further, in the embodiment, the rear combination light may be arranged below a trunk which is mounted on the vehicle body above a rear wheel of the motorcycle.

According to this embodiment, the rear combination light is arranged below the trunk which is arranged above the rear wheel of the motorcycle and hence, even in the motorcycle where the securing of an operation space is difficult, a wiring operation of the rear combination light can be carried out relatively easily whereby the man-hours for a mounting/dismounting operation of the rear combination light can be reduced.

A first clip 37 of an embodiment corresponds to the vehicle-body-side wire holding portion.

Obviously, numerous modifications and variations of the present invention are possible in light of the above teachings. It is therefore to be understood that within the scope of the appended claims, the invention may be practiced otherwise than as specifically described herein.

What is claimed is:

1. A wiring structure of a rear combination light of a vehicle, comprising:
 a light-side wire extending from the rear combination light which is mounted on a rear portion of a vehicle body and which faces a rear surface of the vehicle body, the light-side wire being connected to a vehicle-body-side wire between the rear surface of the vehicle body and the rear combination light;
 a vehicle-body-side wire holding portion mounted on the rear surface of the vehicle body to hold an intermediate portion of the vehicle-body-side wire;
 a stay extending along a mounting direction to mount the rear combination light on the rear portion of the vehicle body, the stay being mounted on the rear combination light;
 a light-side wire holding portion mounted on the stay to hold an intermediate portion of the light-side wire on a distal end portion of the stay; and
 a wire coupler arranged between the rear surface of the vehicle body and a back surface of the rear combination light, the light-side wire being connected to the vehicle-body-side wire via the wire coupler in a state where the rear combination light is mounted on the rear portion of the vehicle body.

2. The wiring structure of a rear combination light of a vehicle according to claim 1, wherein
 the stay is mounted on the rear combination light at a position offset to one side from an imaginary straight line which extends in a longitudinal direction of the vehicle body while passing a center of the rear combination light in a vehicle widthwise direction in a state where the rear combination light is mounted on the rear portion of the vehicle body, and
 the vehicle-body-side wire holding portion is arranged at a position offset to the other side from the imaginary straight line in the vehicle widthwise direction in a state where the rear combination light is mounted on the rear portion of the vehicle body.

3. The wiring structure of a rear combination light of a vehicle according to claim 2, wherein
 the vehicle-body-side wire holding portion is disposed closer to the imaginary straight line than the stay in the vehicle widthwise direction in a state where the rear combination light is mounted on the rear portion of the vehicle body.

4. The wiring structure of a rear combination light of a vehicle according to claim 2, wherein
 the wire coupler is disposed on the imaginary straight line in a state where the rear combination light is mounted on the rear portion of the vehicle body when viewed from a direction perpendicular to the longitudinal direction and vehicle widthwise direction.

5. The wiring structure of a rear combination light of a vehicle according to claim 1, wherein
 a length of the stay is set such that, in a state where the rear combination light is mounted on the rear portion of the vehicle body, the stay extends toward a front side of the vehicle body beyond the rear surface of the vehicle body on which the vehicle-body-side wire holding portion is mounted.

6. The wiring structure of a rear combination light of a vehicle according to claim 5, wherein
 a wire length of the light-side wire from the vehicle-body-side wire holding portion to the light-side wire holding portion at the distal end of the stay is set to a value which is obtained by adding the length of the stay to a length between the stay and the vehicle-body-side wire holding portion in a state where the rear combination light is mounted on the rear portion of the vehicle body.

7. The wiring structure of a rear combination light of a vehicle according to claim 1, wherein
 the rear combination light includes a pair of left and right tail lights, and a pair of left and right blinker lights which sandwiches the tail lights from both sides in a vehicle widthwise direction.

8. The wiring structure of a rear combination light of a vehicle according to claim 1, wherein
 the vehicle body is a vehicle body of a motorcycle.

9. The wiring structure of a rear combination light of a vehicle according to claim 1, wherein
 the rear combination light is arranged below a trunk which is mounted on the vehicle body above a rear wheel of the motorcycle.

10. The wiring structure of a rear combination light of a vehicle according to claim 2, wherein
 a length of the stay is set such that, in a state where the rear combination light is mounted on the rear portion of the vehicle body, the stay extends toward a front side of the vehicle body beyond the rear surface of the vehicle body on which the vehicle-body-side wire holding portion is mounted.

11. The wiring structure of a rear combination light of a vehicle according to claim 10, wherein
 a wire length of the light-side wire from the vehicle-body-side wire holding portion to the light-side wire holding portion at the distal end of the stay is set to a value which is obtained by adding the length of the stay to a length between the stay and the vehicle-body-side wire holding portion in a state where the rear combination light is mounted on the rear portion of the vehicle body.

12. The wiring structure of a rear combination light of a vehicle according to claim 2, wherein
the rear combination light includes a pair of left and right tail lights, and a pair of left and right blinker lights which sandwiches the tail lights from both sides in a vehicle widthwise direction.

13. The wiring structure of a rear combination light of a vehicle according to claim 2, wherein
the vehicle body is a vehicle body of a motorcycle.

14. The wiring structure of a rear combination light of a vehicle according to claim 2, wherein
the rear combination light is arranged below a trunk which is mounted on the vehicle body above a rear wheel of the motorcycle.

15. The wiring structure of a rear combination light of a vehicle according to claim 3, wherein
the rear combination light includes a pair of left and right tail lights, and a pair of left and right blinker lights which sandwiches the tail lights from both sides in a vehicle widthwise direction.

16. The wiring structure of a rear combination light of a vehicle according to claim 3, wherein
the vehicle body is a vehicle body of a motorcycle.

17. The wiring structure of a rear combination light of a vehicle according to claim 3, wherein
the rear combination light is arranged below a trunk which is mounted on the vehicle body above a rear wheel of the motorcycle.

18. The wiring structure of a rear combination light of a vehicle according to claim 4, wherein
the rear combination light includes a pair of left and right tail lights, and a pair of left and right blinker lights which sandwiches the tail lights from both sides in a vehicle widthwise direction.

19. The wiring structure of a rear combination light of a vehicle according to claim 4, wherein
the vehicle body is a vehicle body of a motorcycle.

20. The wiring structure of a rear combination light of a vehicle according to claim 4, wherein
the rear combination light is arranged below a trunk which is mounted on the vehicle body above a rear wheel of the motorcycle.

* * * * *